United States Patent
Zhang et al.

(10) Patent No.: US 10,737,584 B2
(45) Date of Patent: Aug. 11, 2020

(54) BATTERY STATE OF CHARGE RESET

(71) Applicant: Ford Global Technologies, LLC, Dearborn, MI (US)

(72) Inventors: Yuan Zhang, Southgate, MI (US); Rui Wang, Canton, MI (US); Xu Wang, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 111 days.

(21) Appl. No.: 16/164,046

(22) Filed: Oct. 18, 2018

(65) Prior Publication Data

US 2020/0122584 A1  Apr. 23, 2020

(51) Int. Cl.
| | |
|---|---|
| B60L 53/60 | (2019.01) |
| B60K 6/20 | (2007.10) |
| B60L 1/00 | (2006.01) |
| B60H 1/32 | (2006.01) |
| B60L 58/12 | (2019.01) |
| B60L 53/14 | (2019.01) |

(52) U.S. Cl.
CPC ............ B60L 53/60 (2019.02); B60H 1/3205 (2013.01); B60K 6/20 (2013.01); B60L 1/00 (2013.01); B60L 58/12 (2019.02); *B60H 2001/3272* (2013.01); *B60L 53/14* (2019.02); *B60L 2210/10* (2013.01); *B60Y 2200/91* (2013.01); *B60Y 2200/92* (2013.01); *B60Y 2300/91* (2013.01)

(58) Field of Classification Search
CPC . B60L 53/60; B60L 58/12; B60L 1/00; B60H 1/3205; B60K 6/20
USPC ........................................................ 320/132
See application file for complete search history.

(56) References Cited

U.S. PATENT DOCUMENTS

| | | | |
|---|---|---|---|
| 6,841,972 B2 | 1/2005 | Koo | |
| 7,634,369 B2 | 12/2009 | Lim et al. | |
| 7,800,345 B2 | 9/2010 | Yun et al. | |
| 9,834,106 B2 | 12/2017 | Min | |
| 2009/0321163 A1* | 12/2009 | Suzui | H02J 7/0021 180/65.265 |
| 2014/0111139 A1* | 4/2014 | Chen | H01F 27/28 320/137 |
| 2020/0047622 A1* | 2/2020 | Asr | B60L 53/00 |
| 2020/0047625 A1* | 2/2020 | Kim | B60L 58/12 |

FOREIGN PATENT DOCUMENTS

KR  20090112244 A  10/2009

* cited by examiner

*Primary Examiner* — Suresh Memula
(74) *Attorney, Agent, or Firm* — David Kelley; Brooks Kushman, P.C.

(57) ABSTRACT

A system for a vehicle including a traction battery, electrical loads, and a controller configured to, during a charge operation, activate the loads such that charge current output by a charger is consumed by the loads and charge current input to the battery approaches zero to update a state of charge (SOC) value of the battery, and deactivate the loads upon completion of the update such that charge current input to the battery increases.

18 Claims, 5 Drawing Sheets

BATTERY STATE OF CHARGE RESET

TECHNICAL FIELD

The present disclosure relates to systems and methods for resetting a battery state of charge (SOC).

BACKGROUND

A hybrid or an electric vehicle may be equipped with at least one traction battery configured to provide energy for propulsion. The traction battery may also provide energy for other vehicle electrical components. For example, the traction battery may transfer energy to high voltage loads, such as compressors and electric heaters. In another example, the traction battery may provide energy to low voltage loads.

SUMMARY

A system for a vehicle including a traction battery, electrical loads, and a controller configured to, during a charge operation, activate the loads such that charge current output by a charger is consumed by the loads and charge current input to the battery approaches zero to update a state of charge (SOC) value of the battery, and deactivate the loads upon completion of the update such that charge current input to the battery increases.

A charging system for a vehicle including a controller configured to, during a charge operation, reduce charge current output by a charger to a non-zero value such that charge current input to a traction battery approaches zero to update a state of charge value of the battery, and increase, upon completion of the update, the charge current output by the charger such that charge current input to the battery increases.

A system for a vehicle including a traction battery and an A/C compressor, and a controller configured to, during a charge operation, reduce battery charger output such that the output is consumed by the compressor and does not charge the battery to update a state of charge (SOC) value of the battery, and increase, upon completion of the update, the output to charge the battery.

DETAILED DESCRIPTION

Figure 1:
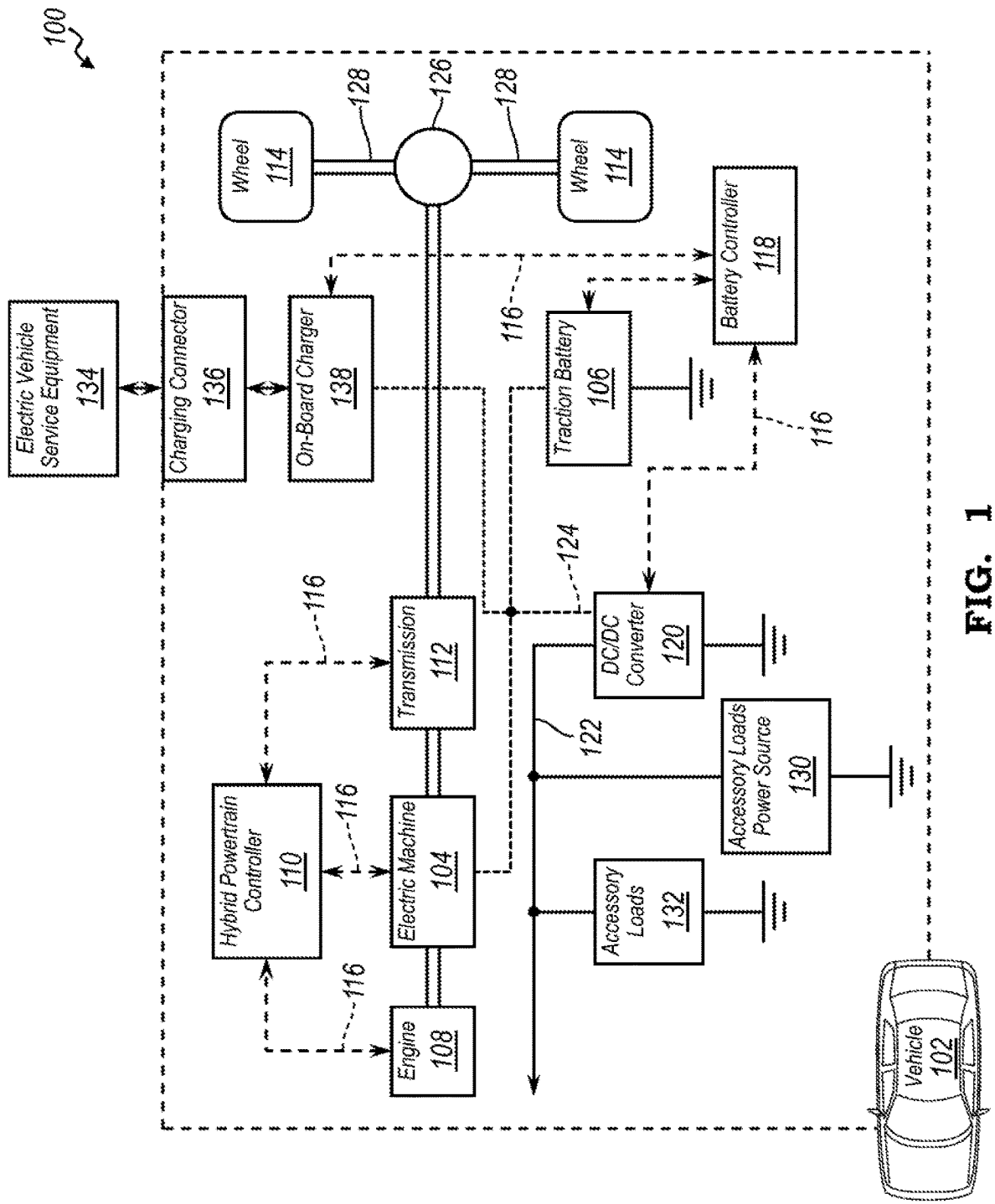
FIG. 1 is a block diagram of a plug-in hybrid electric vehicle (THEY) illustrating a typical drivetrain and energy storage components.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A plug-in or hybrid vehicle may be configured to determine a traction battery state of charge (SOC) using a combination of an open circuit voltage (OCV), Ah integration (or Coulomb counting), an open circuit voltage (OCV)-state of charge (SOC) reset methods. The OCV-SOC reset of the traction battery may be performed when the traction battery is not supporting an electrical load and is said to be, electrically "unloaded."

In one example, an OCV-SOC reset of the traction battery may be performed during vehicle power up sequence, such as, before a main positive contactor is closed and the traction battery is not supplying an electrical load. As another example, an OCV-SOC reset may be performed, during AC charging, when the traction battery SOC is within a threshold of 100%. In one example scenario, in response to a traction battery SOC based on Ah integration approaching 100%, a battery controller may send a signal, to an onboard charger, requesting that charge current flow be reduced to a zero-current level and may disable a DC-DC converter. If the actual battery SOC determined according to the OCV-SOC reset is less than 100%, the battery controller may be configured to re-activate charge current flow to the battery, such that battery SOC at the end of a charging session may reach 100%.

Several limitations may apply when an OCV-SOC reset is performed during active charging. In one example, a given off-board charger (hereinafter, electrical vehicle service equipment (EVSE)) may be configured to prevent a reduction of charge current to a zero-current level, such as under some charging system guidelines a required charge current output may be required to be based on a minimum non-zero output capacity of the EVSE when either requested voltage or current is zero. As another example, under some Charging system specifications, a charging sequence, once ended, may not be reentered, e.g., a charging handshake sequence reentry is not supported and instead the sequence may need to be started from the beginning following a full manual disconnect, i.e., unplugging, and a subsequent reconnection to the vehicle. In some instances, during active charging, all contactors in the vehicle high voltage system may remain closed. Accordingly, removing electrical loads entirely on both auxiliary and main electrical buses to conduct an OCV-SOC reset may not be possible under system operating requirements.

When an OCV-SOC reset during battery charging is not available, errors and customer dissatisfaction may result, such as When battery charge is interrupted by the system prior to SOC of the traction battery reaching 100%. This could result from a premature determination by the battery controller, based, for instance, on computations completed using Ah integration method, that a full battery charge has been achieved and interrupting the flow of charge current to the battery. In some instances, vehicle user may thereby experience a reduced all-electric range and/or a battery charge gauge may display a value less than 100% at vehicle start, despite being plugged in to the EVSE for a sufficient period to receive a full charge.

Model-based SOC adjustment during charging may be performed while the vehicle is being charged (e.g., during active charge current transfer). To do this, a battery controller may be configured to compare a first estimated SOC calculated by Ah integration to a second estimated SOC calculated using one or more model-based estimation methods. If a difference between the first and second estimated SOC is greater than a threshold, the battery controller may adjust the first estimated SOC according to Equation (1):

$$SOC_1[i+1] = \frac{(SOC_1[i] \times W + SOC_2[i]}{W+1} \qquad (1)$$

where $SOC_1$ is indicative of the first estimated SOC of the battery calculated using Ah integration, $SOC_2$ is indicative of the second estimated SOC of the battery calculated using one or more model-based SOC estimation methods, and W is indicative of a weighting factor. In some instances, a large weighting factor W may affect the SOC calculated using the Ah integration. However, since model-based SOC estimation calculates the SOC of the battery as a function of battery voltage, current, temperature, and battery age, the computation may, therefore, be vulnerable to the measurement errors or other inaccuracies of the model. Thus, adjusting the Ah integration based SOC towards model-based SOC calculation may provide little or no improvement in SOC estimation accuracy.

The OCV-based SOC adjustment may be performed when the traction battery charging is complete, such that when the traction battery SOC is approaching charge completion, i.e., 100% SOC. In one example, the battery controller may create a zero or near-zero charge current condition for the battery by manipulating the charging current request that is sent to the battery charger. The battery controller may then evaluate and adjust the battery SOC based on the battery voltage after a certain relaxation time, and re-enter charging sequence if needed.

The battery controller may be configured to perform OCV-based SOC adjustment during powering up of the battery management system. In one example, the battery controller may measure the traction battery voltage and may adjust the SOC of the battery based on the OCV-SOC mapping, While being the only adjustment method available during an active charging session, model-based SOC estimation may be inaccurate. The OCV-based SOC estimation is considered a more accurate SOC estimation method, but, nevertheless, the method may be of limited utility, since it is only performed when the traction battery SOC approaches 100% or during vehicle power up. Performing the OCV-based SOC adjustment only when the traction battery charging approaches a predefined SOC level or at power up may result in the accumulated SOC estimation error that may remain uncorrected during charging.

Therefore, under some reset strategies, a discrepancy may occur if a vehicle user interrupts the charging session before a threshold charge is achieved. For example, if a user unplugs the vehicle prior to the adjustment based on the OCV-based SOC estimation, e.g., prior to the SOC reaching 85%, and then immediately powers up the vehicle, the user may observe an SOC level that resulted from an OCV-based SOC adjustment performed at the power up, and may be lower, e.g., an SOC of 80%, or otherwise different from the SOC level reported immediately before being unplugged from the charger.

In some instances, an event-triggered method may be performed for electric vehicle battery SOC adjustment with external power supply. Such that the battery controller may perform the OCV-based SOC adjustment when the adjustment is needed, rather than only when close to charge complete or at power up.

In one example, the battery controller may use the battery SOC rationality monitor by evaluating the difference between the estimated SOC calculated by Ah integration ($SOC_1$) and that calculated by model-based estimation methods ($SOC_2$). If the calculated SOC difference between these two methods is beyond a calibratable threshold, instead of correcting $SOC_1$ towards $SOC_2$, e.g., as per the model-based SOC adjustment, the battery controller may temporarily pause or slow down flow of charge current to the battery to perform an OCV-SOC reset to correct the accumulated SOC estimation error.

The Ah integration of the battery state of charge may be calculated using Equation (2):

$$SOC_1[k] = SOC_1[k-1] + \frac{i[k-1] + i[k]}{2C} \times T_s, \qquad (2)$$

where k is the $k^{th}$ step of SOC evaluation, $SOC_1[k]$ represents the evaluated SOC of the battery calculated using Ah integration, i[k] represents the current measurement at time step k, C represents the battery capacity in Ah, $T_s$ is the sampling, time of the algorithm. $SOC_1$ may be initialized by the OCV-based SOC adjustment at power up.

The model-based SOC estimation method may be performed such that:

$$SOC_2[k] = f(i[k], u[k], T[k], A[k]i, \qquad (3)$$

where k is representative of the $k^{th}$ step of SOC evaluation, $SOC_2[k]$ is representative the evaluated SOC of the battery calculated using model based method, i[k], u[k], T[k], A[k] is representative of the current, voltage, temperature, and age of the battery, at time step k, respectively. In some instances, the battery age A[k] may be estimated by using a battery equivalent internal resistance. While the model-based SOC estimation is described as being based on battery current, voltage, temperature, and battery age, the SOC estimation model developed through battery testing or other battery SOC estimation algorithms is also contemplated.

During a given charging session, the battery controller may be configured to determine both the first and second estimated $SOC_1[k]$ and $SOC_2[k]$, and the OCV-based SOC adjustment may be triggered at time step k if $|SOC_1[k] - SOC_2[k]| \geq \epsilon$, where $\epsilon$ is a calibratable threshold range from 0 to 1. Finally, to perform the OCV-based SOC adjustment, the battery controller may induce a zero or near-zero current condition for the battery by manipulating the charging current request that is sent to the battery charger. The battery controller may then evaluate and adjust the battery SOC based on the battery voltage after a certain relaxation time, and re-enter charging sequence if needed.

In some instances, responsive to a request to complete an OCV-SOC reset during active charging, the battery controller may be configured to evaluate a total non-battery charge current $I_{Nonbatt\_Load}$ used by the electrical loads on both auxiliary and main buses. In one example, the total non-battery charge current $I_{Nonbatt\_Load}$ may be based on a difference between charge current received at the traction battery and charge current output to the vehicle by the off-board charger.

In some other instances, the battery controller may be configured to adjust a requested battery charge current, $I_{Batt\_Chrg\_Rq}$ such that a battery input charge current $I_{Batt\_in\_Chrg}$ approaches a zero-current value. As some non-limiting examples, the battery controller may adjust the requested battery charge current, $I_{Batt\_Chrg\_Rq}$ using one of a static calculation and running average calculation.

The battery controller may be configured to determine a total non-battery charge current $I_{Nonbatt\_Load}$ being actively used by the electrical loads connected to the traction battery based on Equation (4):

$$I_{Nonbatt\_Load} = I_{Chargr\_Output} - I_{Batt\_in\_Chrg}, \quad (4)$$

where $I_{Chargr\_Output}$ is indicative of current being output by one of the AC charger during AC charging, $I_{Chargr\_Output} = I_{AC\_Charger}$, and the DC charger during DC charging, i.e., $I_{Chargr\_Output} = I_{DC\_Charger}$, and $I_{Batt\_in\_Chrg}$ is indicative of battery input charge current received at the traction battery.

Responsive to a request for an OCV-SOC reset, the battery controller may induce a "near zero" charge current flow through the traction battery by adjusting one or more parameters such that the battery input charge current $I_{Batt\_in\_Chrg}$ to be approximately equal to zero (0). In one example, the battery controller may adjust the requested battery charge current $I_{Batt\_Chrg\_Rq}$ to be approximately equal to the total non-battery loads charge current $I_{Nonbatt\_Load}$, such that:

$$I_{Batt\_Chrg\_Rq} = I_{Nonbatt\_Load}, \quad (5)$$

Additionally or alternatively, the battery controller may be further configured to calculate a running average of the requested battery charge current $I_{Batt\_Chrg\_Rq}$ using Equation (6):

$$I_{Batt\_Chrg\_Rq}(k+1) == \quad (6)$$
$$a \times I_{Batt\_Chrg\_Rq}(k) + (1-a) \times \times I_{Nonbatt\_Load}(k+1),$$

where $I_{Batt\_Chrg\_Rq}(k)$ is indicative of the requested battery charge current during a previous ($k^{th}$) transmission and $\alpha$ is indicative of a "forgetting" factor, or a rate at which the battery controller erases or overwrites a previous load current value, such that $0<\alpha>1$. While the static calculation illustrated in Equation (5) may result in the requested battery charge current $I_{Batt\_Chrg\_Rq}$ profile that is too coarse such that the on-board charger of the vehicle may be unable to respond to the request timely or correctly, using a "forgetting" factor, a may support gradual changing of the requested battery charge current $I_{Batt\_Chrg\_Rq}$.

The battery controller may then monitor the charger output charge current $I_{Chargr\_Output}$ as reported by one of the on-board battery charger of the vehicle and off-board stand-alone charger. Responsive to the charger output charge current $I_{Chargr\_Output}$ being within a threshold of the adjusted requested battery charge current $I_{Batt\_Chrg\_Rq}$, e.g., a difference be $I_{Chargr\_Output}$ and the total non-battery loads charge current $I_{Nonbatt\_Load}$ being less than a threshold, the battery controller may perform the OCV-SOC reset. Following completion of the OCV-SOC reset, the battery controller may resume a normal charging sequence, or may end charging.

Additionally or alternatively, responsive to the charger output charge current $I_{Chargr\_Output}$ not being within a threshold of the adjusted requested battery charge current $I_{Batt\_Chrg\_Rq}$ e.g., a difference between $I_{Chargr\_Output}$ and the total non-battery loads charge current $I_{Nonbatt\_Load}$ being greater than a threshold, the battery controller may prevent the OCV-SOC reset and may proceed with a normal charging sequence and/or end charging.

Accordingly, the proposed OCV-SOC reset strategy may be applicable to both AC and DC charging while an external power supply remains connected with the vehicle. Further, the proposed OCV-SOC reset strategy may be common among vehicles that accept different charging methods. The proposed OCV-SOC reset strategy is consistent with the global charging standards and allows OCV-SOC reset to be performed while the charging connector is connected to the vehicle.

FIG. 1 illustrates an example system 100 for a hybrid electric vehicle (hereinafter, vehicle) 102. The vehicle 102 includes one or more electric machines 104 capable of operating as one or both of an electric motor and generator, a traction battery 106, an engine 108, and a multiple-ratio automatic transmission 112. The vehicle 102 further includes a hybrid powertrain controller 110 configured to monitor and control 116 operation of one or more components of the vehicle 102.

The engine 108 and the electric machine 104 are drive sources for the vehicle 102. Although not separately illustrated herein, the engine 108 may, in some instances, be connectable to the electric machine 104 through a disconnect clutch, such that an engine output shaft connectable to a motor input shaft, whereby the engine 108 and the electric machine 104 may be connected in series. The electric machine 104 may be selectively connectable to the engine 108 via, for example, a torque converter.

The transmission 112 is connected to a differential 126 via a corresponding output shaft and drive wheels 114 are connected to the differential 126 through respective axles 128. The driving force applied from the engine 108 and/or the electric machine 104 is transmitted (e.g., through the torque converter and/or the transmission 112) to the drive wheels 114 thereby propelling the vehicle 102. The transmission 112 may include planetary gear sets having a plurality of friction elements selectively engageable to achieve multiple gear ratios. The friction elements may be controllable through a shift schedule that connects and disconnects certain elements of the planetary gear sets to control a ratio between the transmission output torque and the transmission input torque, in one example, the transmission 112 may be automatically shifted from one ratio to another based on the needs of the vehicle 102.

In an example arrangement, the engine 108 may be a primary source of power for the vehicle 102. The engine 108 may be an internal combustion engine, such as a gasoline, diesel, or natural gas-powered engine. The engine 108 generates engine torque that is supplied to the electric machine 104 when the engine 108 and the electric machine 104 are connected with one another. To drive the vehicle 102 with the engine 108, at least a portion of the engine torque passes from the engine 108 to the electric machine 104 and then from the electric machine 104 to the transmission 112.

The traction battery 106 in some arrangements may be another source of propulsion power for the vehicle 102. As described in reference, for example, to FIG. 2B, the traction battery 106 may comprise a plurality of battery cells, e.g., electrochemical cells, electrically connected to a plurality of connectors and switches enabling and disabling the supply and withdrawal of electric energy to and from the battery cells. The plurality of connectors and switches may be electrically operated switches, relays, or other electric, electronic, or electromagnetic components configured to selectively establish, interrupt, or divert current flow between one or more portions of the traction battery 106 and other vehicle components. An example of an electrically controlled switch configured to operate in an HEV is a high voltage contactor.

A battery controller 118 may be configured to monitor and control operation of the traction battery 106. In one example, the battery controller 118 configured to control the plurality of connectors and switches, e.g., contactors, of the traction battery 106. In such an example, the battery controller 118 may command one or more contactors to open or close connecting or disconnecting the traction battery 106 from other vehicle 102 components.

The battery controller 118 may be electrically connected to and in communication with one or more other vehicle controllers, such as, but not limited to, a body controller, a climate control controller, a brake controller, and so on, and may command one or more contactors to open or close in response to receiving a signal from the other vehicle controllers. Additionally or alternatively, the battery controller 118 may be in communication with the hybrid powertrain controller 110 and may command to charge and discharge the traction battery 106 responsive to one or more signals from the hybrid powertrain controller 110. As described in further detail in reference to at least FIG. 2A, the powertrain controller 110, the battery controller 118, and other vehicle controllers may communicate with one another and with other components of the vehicle 102 via one or more in-vehicle networks, such as, but not limited to, one or more of a vehicle controller area network (CAN), an Ethernet network, and a media oriented system transfer (MOST), as some examples.

The battery controller 118 may be further configured to receive signals from a plurality of vehicle 102 sensors (not illustrated), such as, but not limited to, battery voltage sensor, battery current sensor, battery temperature sensor, ambient temperature sensor, and so on. The battery controller 118 may command to transfer energy to and from the traction battery 106 responsive to receiving a signal from the one or more vehicle sensors. While the traction battery 106 is described as including electrochemical cells, other types of energy storage device implementations, such as capacitors, are also contemplated.

The vehicle 102 may be configured to recharge the traction battery 106 via a connection to a power grid. The vehicle 102 may, for example, cooperate with electric vehicle supply equipment (EVSE) 134 of a charging station to coordinate the charge transfer from the power grid to the traction battery 106. In one example, the EVSE 134 may have a charge connector for plugging into a charging connector 136 of the vehicle 102, such as via connector pins that mate with corresponding recesses of the charging connector 136. The charging connector 136 may be electrically connected to an on-board charger (hereinafter, charger) 138. The charger 138 may condition the power supplied from the EVSE 134 to provide the proper voltage and current levels to the traction battery 106. The charger 138 may be electrically connected to and in communication with the EVSE 134 to coordinate the delivery of power to the vehicle 102.

The vehicle 102 may be configured to receive one or more power types, such as, but not limited to, single- or three-phase AC power and DC power. Thee vehicle 102 may be configured to receive different levels of AC and DC voltage including, but not limited to, Level 1 120-volt (V) AC charging, Level 2 240V AC charging, Level 1 200-450V and 80 amperes (A) DC charging, Level 2 200-450V and up to 200A DC charging, Level 3 200-450V and up to 400A DC charging, and so on. Time required to receive a given amount of electric charge may vary among the different charging methods. In some instances, if a single-phase AC charging is used, the traction battery 106 may take several hours to replenish charge. As another example, same amount of charge under similar conditions may be transferred in minutes using other charging methods.

In one example, both the charging connector 136 and the EVSE 134 may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, the Chinese GB/T 27930, GB/T 18487.1, GB/T 20234.1, GB/T 20234.2, GB/T 20234.3 and so on. In one example, the recesses of the charging connector 136 may include a plurality of terminals, such that first and second terminals may be configured to transfer power using Levels 1 and 2 AC Charging, respectively, and third and fourth terminals may be DC charging terminals and may be configured to transfer power using Levels 1, 2, or 3 DC charging.

Differently arranged connectors having more or fewer terminal are also contemplated. In one example, the charging connector 136 may include terminals configured to establish a ground connection, send and receive control signals to and from the EVSE 134, send or receive proximity detection signals, and so on. A proximity signal may be a signal indicative of a state of engagement between the charging connector 136 of the vehicle 102 and the corresponding connector of the EVSE 134. A control signal may be a low-voltage pulse-width modulation (PWM) signal used to monitor and control the charging process. The charger 138 may be configured to initiate transfer of energy to the vehicle 102 responsive to receiving a corresponding signal from the EVSE 134. In one example, the charger 138 may be configured to initiate charging responsive to a duty cycle of the request signal being greater than a predefined threshold.

The traction battery 106 is electrically connected 124 to the electric machine 104, such that energy stored in the traction battery 106 can be used and/or replenished by the electric machine 104. The connection (illustrated generally as a dotted line) 124 between the traction battery 106 and the electric machine 104 may be a high voltage connection configured to transfer voltages greater than 50 volts (V). In one example, the electric machine 104 may be electrically connected to an inverter (not illustrated) providing bi-directional energy transfer between the electric machine 104 and the traction battery 106. When the electric machine 104 operates in a motor mode, the inverter may convert high voltage direct current (DC) output provided by the traction battery 106 to a three-phase alternating current (AC) as may be required for proper functionality of the electric machine 104. When the electric machine 104 operates in a regenerative mode, the inverter may convert the three-phase AC output from the electric machine 104 acting as a generator to the DC input required by the traction battery 106. In addition to providing energy for propulsion, the traction battery 106 may provide energy for other vehicle electrical components, such as one or more compressors and electric heaters, that operate using voltages greater than 50V.

The traction battery 106 may be configured to provide energy to a low voltage DC supply that is compatible with other electrical loads of the vehicle 102. A DC/DC converter 120 may be connected between a low voltage connection 122 used by one or more low voltage subsystems or components and the high voltage connection 124 used by, for example, the electric machine 104 and the traction battery 106. The high and low voltage connections 124, 122 may be electrical circuit connections that operate to transfer respective amounts of electrical current, withstand respective amounts of voltage differential, and so on, that are different from one another. As one example, the high voltage connection 124 may be configured to transfer electrical current greater than electrical current transferred by the low voltage connection 122. As another example, the high voltage connection 124 may connect to components requiring operating voltage that is greater than operating voltage associated with components connected to the low voltage connection 122.

In some instances, the DC/DC converter 120 may be a bi-directional buck-boost converter configured to convert power flowing to and from the high voltage connection 124 and the low voltage connection 122. For example, in buck mode the DC/DC converter 120 may reduce ("buck") the high voltage DC output of the traction battery 106 to low voltage DC input required by the low voltage connection 122 components. In another example, the DC/DC converter 120 operating in a boost mode may increase ("boost") the low voltage DC output of the low voltage connection 122 components to a high voltage DC input compatible with the traction battery 106.

The battery controller 118 may monitor and control operation of the DC/DC converter 120 and the low voltage subsystems or components, such as activating the converter 120 to charge or discharge the low voltage connection 122 components, activating the low voltage connection 122 components to transfer power to assist propulsion, energize or deenergize the low voltage connection 122 components when the engine 108 is turned off, permit or inhibit activation of the converter 120, and so on. Additionally or alternatively, the DC/DC converter 120 and some or all of the low voltage connection 122 components may be configured to receive command signals from the hybrid powertrain controller 110. In some instances, the low voltage subsystems or components electrically connected with one another and with other portions of the vehicle 102 electrical distribution network via the low voltage connection 122 may be generally referred to as a low voltage bus.

The low voltage bus may be an electrical bus connecting together one or more low voltage connection 122 components, such as, but not limited to, an accessory loads power source 130 and accessory loads 132. The accessory loads power source 130 connected to the low voltage connection 122 may be configured to provide energy to the accessory loads 132, such as, but not limited to, cabin and propulsion system climate control, cabin lighting, vehicle audio system, and so on. Other examples of powering the accessory loads 132 may be powering one or more electrical loads of the vehicle 102 daring ignition off and/or engine off states.

Figure 2A:
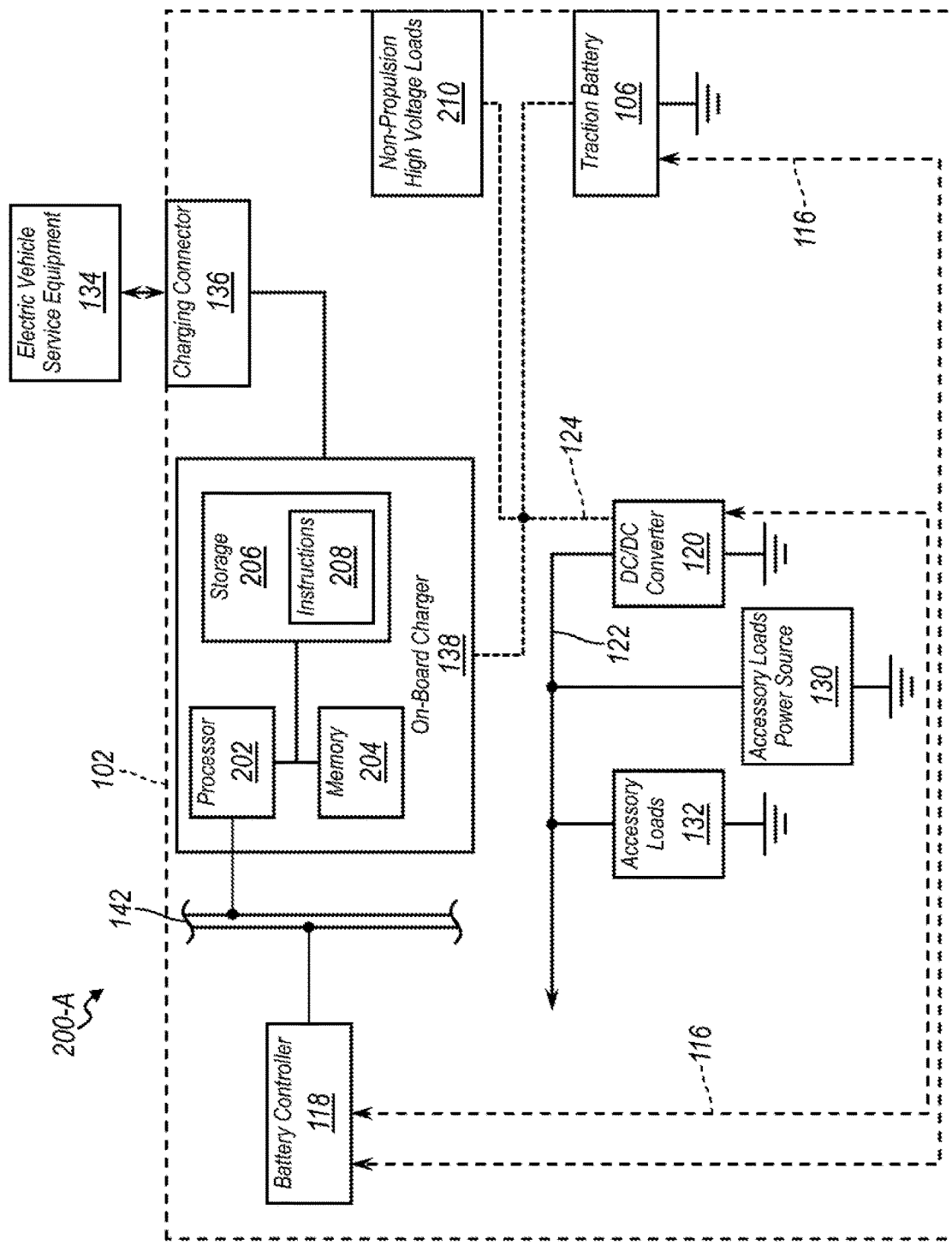
FIGS. 2A-2B are block diagrams illustrating example vehicle system power distribution systems.

FIG. 2A illustrates an example charging system 200-A of the vehicle 102. The charger 138 may include one or more processors 202 connected with both a memory 204 and a computer-readable storage medium 206 and configured to perform instructions, commands, and other routines in support of the processes described herein. For instance, the charger 138 may be configured to execute instructions 208 of battery charging applications to provide features such as one-time or recurring charging scheduling, time remaining to full charge, charging completion alerts, and cabin conditioning preferences during charging and/or immediately following charging completion. Such instructions 208 and other data may be maintained in a non-volatile manner using a variety of types of computer-readable storage medium 206. The computer-readable medium 206 (also referred to as a processor-readable medium or storage) includes any non-transitory (e.g., tangible) medium that participates in providing instructions or other data that may be read by the processor 202 of the charger 138. Computer-executable instructions 208 may be compiled or interpreted from computer programs created using a variety of programming languages and/or technologies, including, without limitation, and either alone or in combination, Java, C, C++, C#, Objective C, Fortran, Pascal, Java Script, Python, Pert, and PL/SQL.

The charger 138 may be in communication, e.g., via an in-vehicle network 142, with the battery controller 118. As some examples, the in-vehicle network 142 may include a vehicle controller area network (CAN), an Ethernet network, and a media-oriented system transfer (MOST). For example, responsive to detecting that the EVSE 134 has been connected to the vehicle 102 via the connector 136, the charger 138 may send a signal to the battery controller 118 indicative of a request to initiate energy transfer to the vehicle 102. The charger 138 and/or the battery controller 118 may then initiate operations, e.g., opening or closing a plurality of switches and so on, to allow the transfer of electric energy from the EVSE 134 to the vehicle 102.

In one example, initiating energy flow from the EVSE 134 to the vehicle 102 may include initiating energy flow from the EVSE 134 to all electrical loads of the vehicle 102. The electrical loads of the vehicle 102 receiving power during a given charging session may include charging loads, e.g., the traction battery 106, and non-charging or non-battery loads, i.e., all electrical loads other than the traction battery 106 being charged. As some examples, the non-charging or non-battery loads receiving power during a given battery charging session may include the high voltage electrical loads, such as, but not limited to, compressors and electric heaters, and the low voltage electrical loads, such as, but not limited to, accessory loads. In some instances, initiating, flow of charge to the vehicle 102 may initiate energy flow to the DC/DC converter 120 connected 122 to one or more accessory loads power sources 130 that in turn power the accessory loads 132.

Figure 2B:
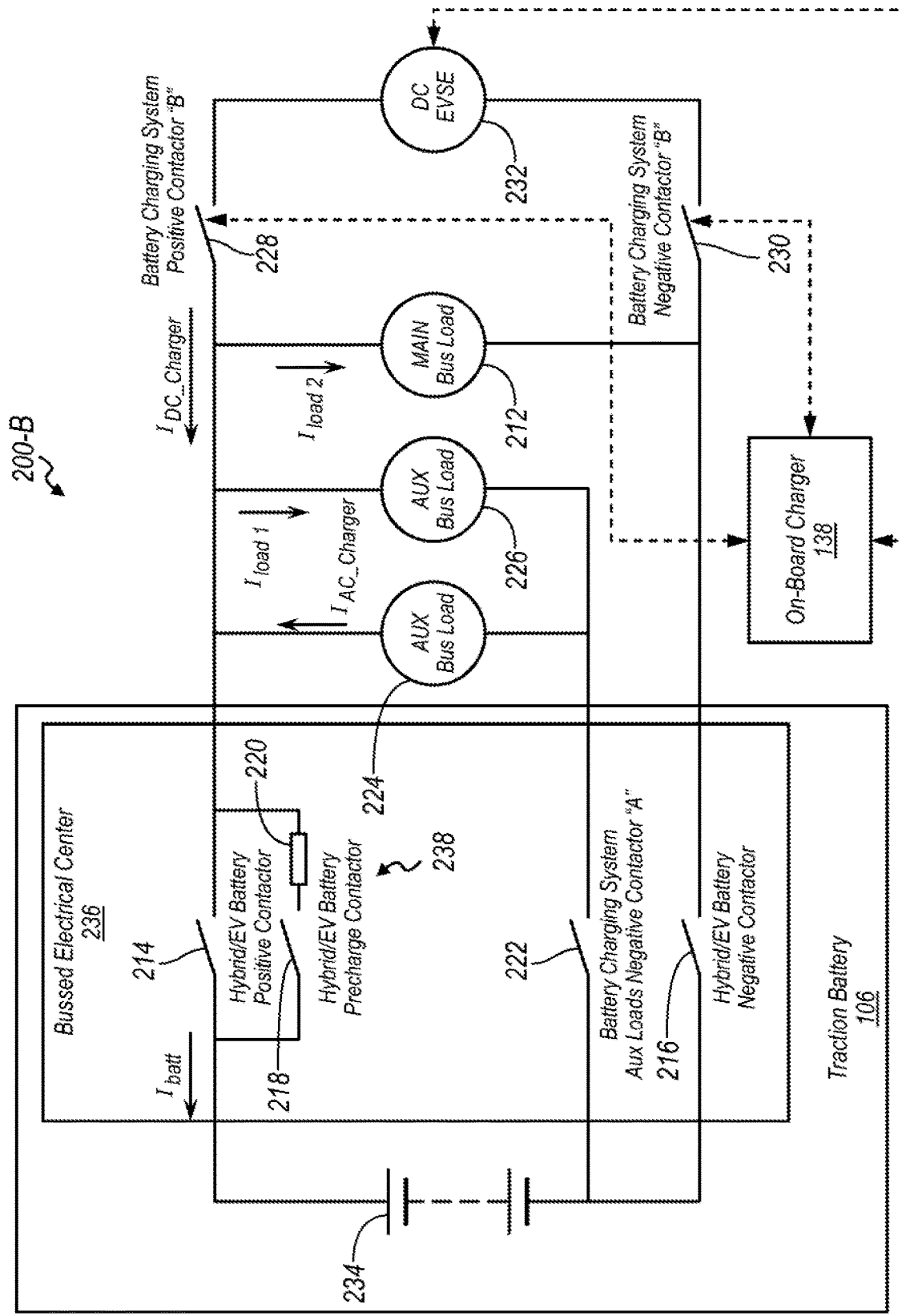

FIG. 2B illustrates an example power system arrangement 200-B of the vehicle 102. The traction battery 106 may include a plurality of battery cells 234, e.g., electrochemical cells, configured to receive and store electric energy for use in operation of the vehicle 102. Each cell 234 may provide a same or different nominal level of voltage. In some instances, several battery cells 234 may be electrically connected with one another into cell arrays, sections, or modules that are electrically connected in series or in parallel with one another. While the traction battery 106 is described herein to include electrochemical battery cells, other types of energy storage device implementations, such as capacitors, are also contemplated.

A bussed electrical center (BEC) 236 of the traction battery 106 may be electrically connected to the battery cells 234 and may include a plurality of connectors and switches allowing a selective supply and withdrawal of electric energy to and from the traction battery 106. The battery controller 118 may be configured to monitor and control operation of the DEC 236, such as, but not limited to, by commanding the BEC 236 to selectively open and close one or more switches. The DEC 236 may include a plurality of connectors and switches allowing the supply and withdrawal of electric energy to and from the battery cells 234 via a connection to corresponding positive and negative terminals of the traction battery 106.

The charger 138 may be configured to initiate traction battery 106 charging responsive to receiving a corresponding request signal from the EVSE 232. In one example, the charger 138 may be configured to initiate charging responsive to a duty cycle of the request signal received from the EVSE 232 being greater than a threshold duty cycle.

The battery controller 118 is connected to the DEC 236 and controls the energy flow between the DEC 236 and the battery cells 234. For example, the battery controller 118 may be configured to monitor and manage temperature and state of charge of each of the battery cells 234. In another example, the battery controller 118 may command the DEC 236 to open or close a plurality of switches in response to temperature or state of charge in a given battery cell reaching a predetermined threshold. The battery controller 118 may further be in communication with other vehicle controllers (not shown), such as an engine controller and transmission controller, and may command the BEC 236 to open or close a plurality of switches in response to a predetermined signal from the other vehicle controllers.

The battery controller 118 may also be in communication with the charger 138. For example, the charger 138 may send a signal to the battery controller 118 indicative of a charging request. The battery controller 118 may then command the BEC 236 to open or close a plurality of switches allowing the transfer of electric energy between the EVSE 232 and the traction battery 106. In one example, the BEC 236 may comprise a positive main contactor 214 electrically connected to the positive terminal of the battery cells 234 and a negative main contactor 216 electrically connected to the negative terminal of the battery cells 234.

In some instances, closing the positive and negative main contactors 214, 216 allows the flow of electric energy to and from the battery cells 234. In such an example, the battery controller 118 may command the BEC 236 to open or close the main contactors 214, 216 in response to a predefined signal, e.g., responsive to a signal from the charger 138 indicative of a request to initiate or terminate battery 106 charging, responsive to a signal to transfer energy between the traction battery 106 and a main electrical bus load (hereinafter, main bus load) 212.

In another example, the battery controller 118 may command the BEC 236 to open or close the main contactors 214, 216 in response to receiving a signal from another vehicle 102 controller, e.g., ECM, TCM, etc., indicative of a request to initiate or terminate transfer of electric energy to and from the traction battery 106. In still another example, the battery controller 118 may perform voltage matching prior to commanding the BEC 236 to open or close a plurality of switches allowing the transfer of electric energy. The main bus loads 212 may include one or more non-propulsion high voltage loads, such as, but not limited to, the high voltage loads 210 described in reference to at least FIG. 2A. Additionally or alternatively, the main bus loads 212 may include the electric machine and the DC/DC converter, such as, but not limited to, the electric machine 104 and the DC/DC converter 120 described in reference to at least FIG. 1, respectively.

The BEC 236 may further comprise a pre-charge circuit 238 configured to control an energizing process of the positive battery terminal. In one example, the pre-charge circuit 238 may include a pre-charge resistor 220 connected in series with a pre-charge contactor 218. The pre-charge circuit 238 may be connected electrically in parallel with the positive main contactor 214. When the pre-charge contactor 218 is closed, the positive main contactor 214 may be open and the negative main contactor 216 may be dosed allowing the electric energy to flow through the pre-charge circuit 238 and control an energizing process of the positive battery terminal.

In one example, the battery controller 118 may command BEC 236 to close the positive main contactor 214 and open the pre-charge contactor 218 in response to voltage level across the positive and negative terminals being greater than a predetermined voltage threshold. The transfer of electric energy to and from the traction battery 106 may then occur via the positive and negative main contactors 214, 216. For example, responsive to the positive and negative main contactors 214, 216 being dosed, the battery controller 118 and/or the EVSE 134 may support electric energy transfer between the traction battery 106 and the inverter during either a motor or a generator mode via a direct connection to conductors of the positive and negative main contactors 214, 216.

In another example, the battery controller 118 may enable energy transfer to the high voltage loads, such as compressors and electric heaters, via a direct connection to the positive and negative main contactors 214, 216. Although not separately illustrated herein, the battery controller 118 may command energy transfer to the low-voltage loads, such as an auxiliary 12V battery, via a DC/DC converter connected to the positive and negative main contactors 214, 216.

For simplicity and clarity AC charging connections between the EVSE 232 and the traction battery 106 have been omitted. In one example, the main contactors 214, 216 in combination with the pre-charge circuit 238 may be used to transfer AC energy between the EVSE 232 and the traction battery 106. For example, the battery controller 118 may be configured to command the opening and closing of the main contactors 214, 216 in response to a signal indicative of a request to initiate an AC or DC charging.

In an example, a positive charge contactor 228 may be electrically in series with the positive main contactor 214 and may connect respective positive terminals of the traction battery 106 and the EVSE 232. A negative charge contactor 230 may be electrically in series with the negative main contactor 216 and may connect respective negative terminals of the traction battery 106 and the EVSE 232. Additionally or alternatively, the positive and negative charge contactors 228, 230 may be disposed within the BEC 236 and/or may be electrically connected to one or more components of the BEC 236.

In some instances, the positive and negative charge contactors 228, 230 may be controlled by one or both the battery controller 118 and charger 138, such that closing the positive and negative charge contactors 228, 230 initiates transfer of energy from the EVSE 232 to the vehicle 102. For example, the charger 138 may issue one or more commands to close both the positive and negative charge contactors 228, 230 in response to a confirmation from the battery controller 118 indicating that charging of the traction battery 106 may be initiated. The charger 138 may command to open the positive and negative charge contactors 228, 230 responsive to a charging completion notification or responsive to another notification or command.

A pair of auxiliary electrical bus loads (hereinafter, auxiliary bus loads) 224, 226 may be representative of one or more high and low voltage electrical components supplying and/or withdrawing energy to and from the traction battery 106. In one example, the auxiliary bus loads 224, 226 may be connected electrically in parallel with one another. In another example, each of the auxiliary bus loads 224, 226 may be connected electrically in parallel with the traction battery 106. Specifically, an auxiliary loads negative charge contactor 222 may connect respective negative terminals of the traction battery 106 and each of the auxiliary bus loads 224, 226.

Figure 3:
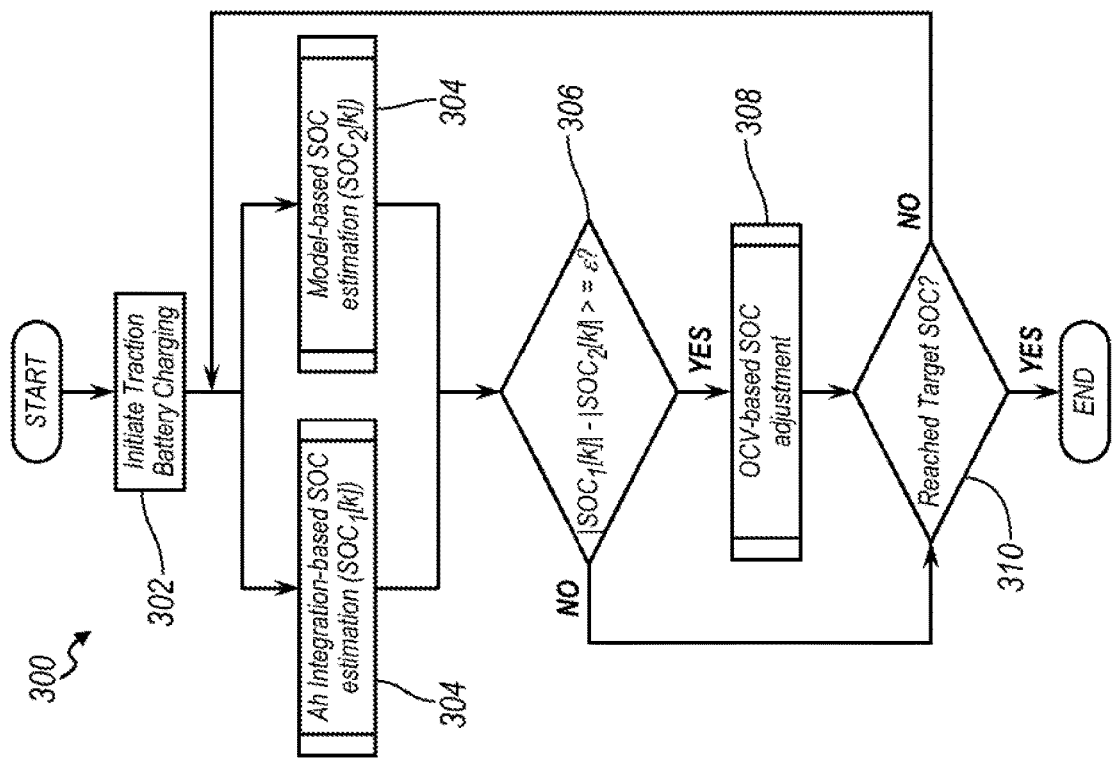
FIG. 3 is a flowchart illustrating an algorithm for an event-triggered initiation of an OCV-SOC reset.

FIG. 3 illustrates an example process 300 for initiating an OCV-SOC reset of the traction battery 106 SOC. The process 300 may be performed by one or more controllers, processors, and other components, such as, but not limited to, the battery controller 118 and the charger 138 described in reference to at least FIGS. 1, 2A, and 2B. The process 300 may begin at block 302 where the battery controller 118 initiates charge current transfer from the EVSE 232 to the traction battery 106. In one example, the battery controller 118 may support energy transfer between the vehicle 102 and the EVSE 232 responsive to closing of the positive and negative charge contactors 228, 230, the positive and negative main contactors 214, 216, and/or the auxiliary loads negative charge contactor 222.

During active energy transfer to the traction battery 106, the battery controller 118, at block 304, may determine a first estimated SOC, $SOC_{est\_1}$, e.g., calculated by Ah integration, and a second estimated SOC, $SOC_{est\_2}$, e.g., calculated using one or more model-based estimation methods. In some instances, the battery controller 118 may determine the first estimated SOC, $SOC_{est\_2}$ according to Equation (2) and/or determine the second estimated SOC, $SOC_{est\_2}$ according to Equation (3). At block 306, the battery controller 118 may determine whether a difference between the first and second estimated SOC $SOC_{est\_1}$, $SOC_{est\_2}$ is greater than a difference threshold.

Responsive to a difference between the first and second estimated SOC $SOC_{est\_1}$ $SOC_{est\_2}$ being greater than a difference threshold, the battery controller 118, at block 308, may adjust the first estimated SOC, $SOC_{est\_1}$ according to OCV-based SOC adjustment method. In one example, the battery controller 118 may adjust the first estimated SOC as described in reference to at least Equation (1). The battery controller 118 may then proceed to block 310.

Responsive to a difference between the first and second estimated SOC $SOC_{est\_1}$, $SOC_{est\_2}$ being less than a difference threshold, the battery controller 118 may, at block 310, determine whether SOC of the traction battery 106 is greater than a predefined target SOC. If SOC of the traction battery 106 is less than a predefined target SOC, the battery controller 118 may return to block 304 where it may determine the first and second estimated SOC $SOC_{est\_1}$, $SOC_{est\_2}$. The battery controller 118 may end the charging session and/or exit the process 300 responsive to SOC of the traction battery 106 being greater than a predefined target SOC. The process 300 may then end. In some instances, the process 300 may be repeated in response to initiation of charge current flow between the traction battery 106 and the EVSE 232 or in response to another signal or command.

Figure 4:
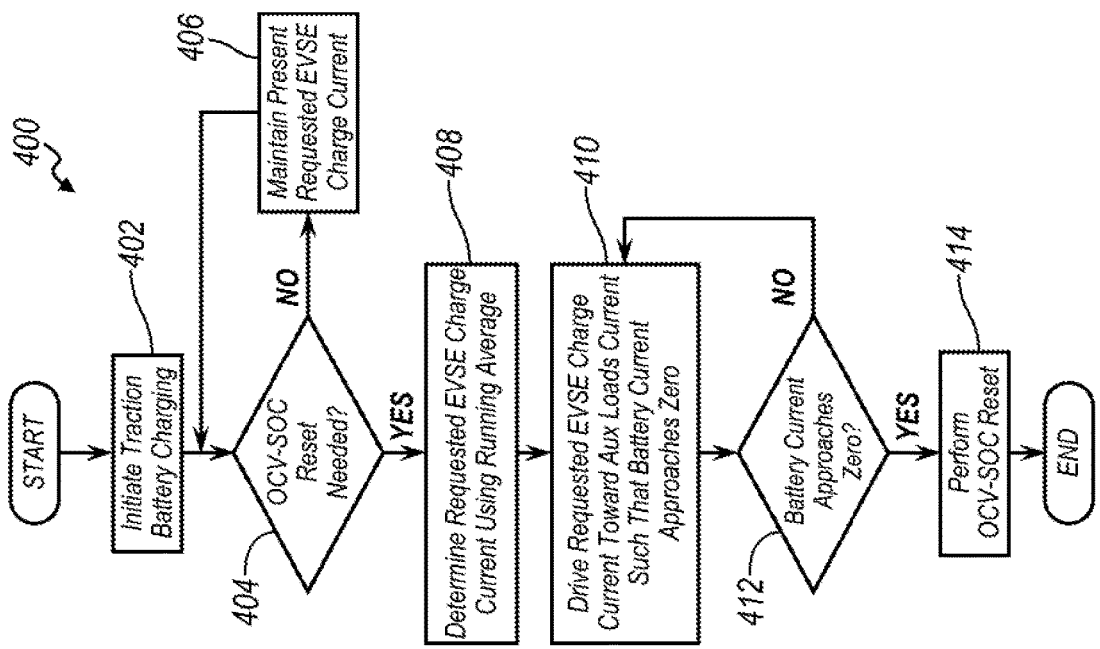
FIGS. 4 and 5 are flowcharts illustrating algorithms for performing an OCV-SOC reset during active battery charging.

FIG. 4 illustrates an example process 400 for performing an OCV-SOC reset of the traction battery 106. The process 400 may be performed by one or more controllers, processors, and other components, such as, but not limited to, the battery controller 118 and the charger 138 described in reference to at least FIGS. 1, 2A, and 2B. Further, one or more blocks of the process 400 may be completed in combination with one or more blocks of the process 300 described in reference to at least FIG. 3.

The process 400 may begin at block 402 where the battery controller 118 initiates charge current transfer from the EVSE 232 to the traction battery 106. At block 404, the battery controller 118 may determine whether an OCV-SOC reset is necessary. In one example, the battery controller 118 may determine that an OCV-SOC reset is necessary responsive to one or more operating conditions of the vehicle 102 and/or the EVSE 232 being true. As another example, the battery controller 118 may determine that an OCV-SOC reset is necessary responsive to a difference between a first and second estimated SOC $SOC_{est\_1}$, $SOC_{est\_2}$ being greater than a difference threshold.

As some non-limiting examples, the battery controller 118 may determine the first estimated SOC, $SOC_{est\_1}$, e.g., calculated using Ah integration according to Equation (2), and the second estimated SOC, $SOC_{est\_2}$, e.g., calculated using one or more model-based estimation methods, according to Equation (3). The battery controller 118 may then determine a difference between the first estimated SOC, $SOC_{est\_1}$ and the second estimated SOC, $SOC_{est\_2}$.

If the conditions for the OCV-SOC reset are not met, the battery controller 118 may proceed to block 406 where it may maintain a requested battery charge current $I_{Batt\_Chrg\_Rq}$ at a predefined value. In some instances, the battery controller 118 may maintain the requested battery charge current $I_{Batt\_Charg\_Rq}$ to be greater than the total non-battery charge current $I_{Nonbatt\_Load}$.

Responsive to conditions for the OCV-SOC being met, the battery controller 118 may at block 408 may perform a running average to determine a desired value or a requested battery charge current $I_{Batt\_Chrg\_Rq}$. At block 410, the battery controller 118 may drive the requested battery, charge current $I_{Batt\_Chrg\_Rq}$ to be approximately equal to the total non-battery charge current $I_{Nonbatt\_Load}$, such that charge current output by the charger approaches the total non-battery charge current $I_{Nonbatt\_Load}$ and the battery charge current received at the traction battery 106 approaches zero.

In some instances, the charge current output by the EVSE 232 $I_{Chargr\_Output}$ may decrease to correspond to the total non-battery charge current $I_{Nonbatt\_Load}$ while keeping unchanged operation of the non-battery loads. Additionally or alternatively, the driving of the requested battery charge current $I_{Batt\_Chrg\_Rq}$ to be approximately equal to the total non-battery loads charge current $I_{Nonbatt\_Load}$ may include activating those of the non-battery loads that have been heretofore inactive such that the total charge current being consumed by the non-battery loads $I_{Nonbat\_Load}$ corresponds to a minimum threshold current to maintain an active charging session between the EVSE 232 and the vehicle 102

The battery controller 118, at block 412, may determine whether charge current output by the charger approaches the total non-battery charge current $I_{Nonbatt\_Load}$ and/or whether the battery charge current received at the traction battery 106 approaches zero. If the corresponding desired charge current values of the charger and traction battery are not achieved, the battery controller 118 may then return to block 410.

Responsive to charge current output by the charger approaching the total non-battery charge current $I_{Nonbatt\_Load}$ and/or the battery charge current received at the traction battery 106 approaching zero, the battery controller 118 may perform the OCV-SOC reset of the traction battery 106 at block 414. The process 400 may then end. In some instances, the process 400 may be repeated in response to initiation of charge current flow between the traction battery 106 and the EVSE 232 or in response to another signal or command.

Figure 5:
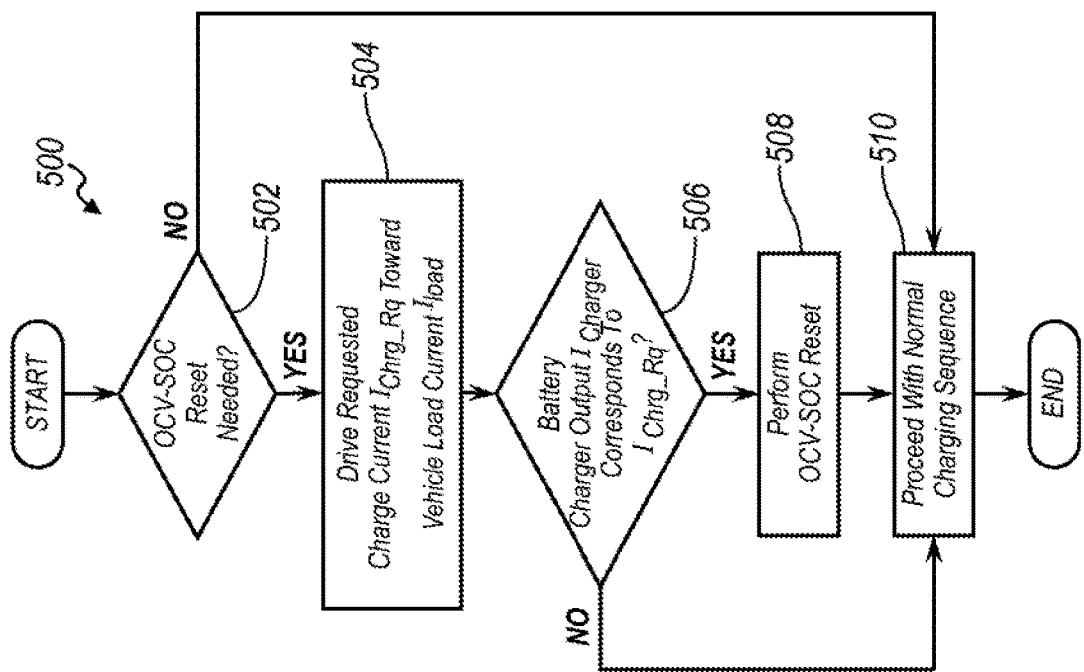

FIG. 5 illustrates an example process 500 performing an OCV-SOC reset during active energy transfer between the vehicle 102 and the EVSE 232. The process 500 may begin at block 502 where the battery controller 118 may determine whether an OCV-SOC reset of an actual SOC of the traction battery 106 is needed. In one example, the battery controller 118 may determine that an OCV-SOC reset is necessary responsive to a difference between a first and second estimated SOC $SOC_{est\_1}$, $SOC_{est\_2}$ being greater than a difference threshold. As some non-limiting examples, the battery controller 118 may determine the first estimated SOC, $SOC_{est\_1}$ using Ah integration and the second estimated SOC, $SOC_{est\_2}$ using one or more model-based estimation methods. The battery controller 118 may then determine a difference between the first estimated SOC, $SOC_{est\_1}$ and the second estimated SOC, $SOC_{est\_2}$ and compare the difference to a difference threshold. Other events and operating conditions causing initiation of an OCV-SOC reset process are also contemplated.

Responsive to an OCV-SOC reset being necessary, the battery controller 118, at block 504, may drive a requested battery charge current $I_{Batt\_Chrg\_Rq}$ to be approximately equal to the total non-battery charge current $I_{Nonbatt\_Load}$ such that charge current $I_{Chargr\_Output}$ output by the EVSE 232 approaches the total non-battery charge e current $I_{Nonbatt\_Load}$ and the battery charge current received at the traction battery 106 approaches zero. In some instances, the driving of the requested battery charge current $I_{Batt\_Chrg\_Rq}$ to be approximately equal to the total non-battery loads charge current $I_{Nonbatt\_Load}$ may include performing a running average of the total non-battery loads charge currents $I_{Nonbatt\_Load}$ over a predefined period and setting the requested battery charge current $I_{Batt\_Chrg\_Rq}$ to be approximately equal to the running average current. In one such an example, the charge current output by the EVSE 232 $I_{Chargr\_Output}$ may decrease to correspond to the total non-battery charge current $I_{Nonbatt\_Load}$ while keeping unchanged operation of the non-battery loads.

Additionally or alternatively, the driving of the requested battery charge current $I_{Batt\_Chrg\_Rq}$ to be approximately equal to the total non-battery loads charge current $I_{Nonbatt\_Load}$ may include activating those of the non-battery loads that have been heretofore inactive such that the total charge current being consumed by the non-battery loads $I_{Nonbatt\_Load}$ corresponds to a minimum threshold current to maintain an active charging session between the EVSE 232 and the vehicle 102.

At block 506, the battery controller 118 may determine whether charge current output by the EVSE 232 approaches the total non-battery loads charge current $I_{Nonbatt\_Load}$ and/or whether the battery charge current received at the traction battery 106 approaches zero. If the corresponding desired charge current values of the EVSE 232 and traction battery 106 are not achieved, the battery controller 118 may then proceed to block 510.

Responsive to charge current output by the EVSE 232 approaching the total non-battery charge current $I_{Nonbatt\_Load}$ and/or the battery charge current received at the traction battery 106 approaching zero, the battery controller 118 may perform the OCV-SOC reset of the traction battery 106 at block 508. The process 400 may then end. In some instances, the process 400 may be repeated in response to initiation of charge current flow between the traction battery 106 and the EVSE 232 or in response to another signal or command.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising:
   a traction battery;
   electrical loads; and
   a controller configured to, during a charge operation,
     activate the loads such that charge current output by a charger is consumed by the loads and charge current input to the battery approaches zero to update a state of charge (SOC) value of the battery, and
     deactivate the loads upon completion of the update such that charge current input to the battery increases.

2. The system of claim 1, wherein the activating is in response to a difference between a model-estimated SOC value and an integration-estimated SOC value being greater than a difference threshold.

3. The system of claim 2, wherein the activating is further in response to each of the estimated SOC values being less than an SOC threshold.

4. The system of claim 1, wherein the charge current consumed by the loads is based on a running average of the currents consumed over a predefined period.

5. The system of claim 1, wherein the controller is further configured to reduce charge current output by the charger to correspond to charge current needed to operate the loads.

6. The system of claim 5, wherein the reduced charge current output by the charger corresponds to an active charging threshold.

7. A charging system for a vehicle comprising:

a controller configured to, during a charge operation, reduce charge current output by a charger to a non-zero value such that charge current input to a traction battery approaches zero to update a state of charge value of the battery, and increase, upon completion of the update, the charge current output by the charger such that charge current input to the battery increases.

8. The system of claim 7, wherein the reduced charge current corresponds to an active charging threshold.

9. The system of claim 7, wherein the reducing is responsive to a difference between a model-estimated SOC value and an integration-estimated SOC value being greater than a difference threshold.

10. The system of claim 7, wherein the controller is further configured to activate electrical loads of the vehicle such that the reduced charge current is consumed by the loads.

11. The system of claim 10, wherein the reducing is based on a running average of the currents consumed over a predefined period.

12. The system of claim 10, wherein the controller is further configured to deactivate the loads upon completion of the update.

13. A system for a vehicle comprising:

a traction battery and an A/C compressor; and a controller configured to, during a charge operation, reduce battery charger output such that the output is consumed by the compressor and does not charge the battery to update a state of charge (SOC) value of the battery, and increase, upon completion of the update, the output to charge the battery.

14. The system of claim 13, wherein the reducing is in response to a difference between a model estimated SOC value and an integration-estimated SOC value being greater than a difference threshold.

15. The system of claim 14, wherein the reducing is further in response to each of the estimated SOC values being less than an SOC threshold.

16. The system of claim 13, wherein charge current consumed by the compressor is based on a running average of charge current consumed over a predefined period.

17. The system of claim 13, wherein, prior to the reducing, the controller is further configured to activate a DC/DC converter of the vehicle such that the output is consumed by the compressor and charge current to the battery approaches zero.

18. The system of claim 17, wherein the controller is further configured to, upon completion of the update, deactivate the compressor.

* * * * *